(12) United States Patent
Louis et al.

(10) Patent No.: US 8,855,439 B2
(45) Date of Patent: Oct. 7, 2014

(54) METHOD FOR DETERMINING A LOCALIZATION ERROR IN A GEOREFERENCED IMAGE AND RELATED DEVICE

(75) Inventors: Christian Louis, Massy (FR); Sebastien Reynaud, Massy (FR); Laurent Spery, Massy (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 13/335,406

(22) Filed: Dec. 22, 2011

(65) Prior Publication Data

US 2012/0189224 A1 Jul. 26, 2012

(30) Foreign Application Priority Data

Dec. 23, 2010 (FR) ..................................... 10 05103

(51) Int. Cl.
| | | |
|---|---|---|
| *G06K 9/32* | (2006.01) | |
| *G06K 9/40* | (2006.01) | |
| *G09B 29/10* | (2006.01) | |
| *G09B 25/06* | (2006.01) | |
| *G06T 17/05* | (2011.01) | |

(52) U.S. Cl.
CPC ............... *G09B 29/106* (2013.01); *G09B 25/06* (2013.01); *G06T 17/05* (2013.01)
USPC .......................................... 382/255; 382/295

(58) Field of Classification Search
USPC ......... 382/154, 255, 284–285, 289, 295, 296, 382/300; 348/42, 47, 135, 144
See application file for complete search history.

(56) References Cited

U.S. PATENT DOCUMENTS

| | | | | |
|---|---|---|---|---|
| 5,519,816 | A * | 5/1996 | Pomerantz et al. | 345/419 |
| 6,757,445 | B1 * | 6/2004 | Knopp | 382/285 |
| 7,391,899 | B2 * | 6/2008 | Rahmes et al. | 382/154 |
| 7,567,731 | B2 * | 7/2009 | McDowall et al. | 382/294 |
| 7,603,208 | B2 * | 10/2009 | Garceau et al. | 701/3 |
| 7,616,828 | B2 * | 11/2009 | Rahmes et al. | 382/260 |
| 7,760,913 | B2 * | 7/2010 | Rahmes et al. | 382/109 |

(Continued)

FOREIGN PATENT DOCUMENTS

WO WO 2008/100879 8/2008

OTHER PUBLICATIONS

Paul A. Zandbergen, Error Propagation Modeling for Terrain Analysis using Dynamic Simulation Tools in ArcGIS Modelbuilder, Geomorphometry 2011.*

(Continued)

*Primary Examiner* — Andrae S Allison
(74) *Attorney, Agent, or Firm* — Knobbe Martens Olson & Bear LLP

(57) ABSTRACT

The invention relates to a method for determining a localization error ($\epsilon$) of a point ($P_0$) of a raw image, comprising the following steps: estimating the value of a statistical magnitude (G) characteristic of a probability law (D(X, Y, Z)) of at least one terrain coordinate (X, Y, Z) associated with the point ($P_0$) of the raw image, using a probability law (D($\theta_1, \ldots, \theta_n$)) with magnitudes ($\theta_1, \ldots, \theta_n$) depending on the exposure conditions of the raw image and a localization function, deduced from an exposure function and a terrain model and applied for the image coordinate point ($P_0$) of the raw image; and deducing the localization error ($\epsilon$) of the point ($P_0$) of the raw image from the statistical magnitude (G).

11 Claims, 11 Drawing Sheets

(56) References Cited

U.S. PATENT DOCUMENTS

| | | | |
|---|---|---|---|
| 2005/0031197 A1* | 2/2005 | Knopp | 382/154 |
| 2006/0041375 A1* | 2/2006 | Witmer et al. | 701/208 |
| 2006/0228019 A1* | 10/2006 | Rahmes et al. | 382/154 |
| 2008/0273759 A1* | 11/2008 | Rahmes et al. | 382/109 |
| 2008/0319723 A1 | 12/2008 | Smith | |
| 2009/0083008 A1* | 3/2009 | Allen et al. | 703/2 |
| 2009/0083012 A1* | 3/2009 | Allen et al. | 703/6 |
| 2009/0271719 A1* | 10/2009 | Clare et al. | 715/762 |

OTHER PUBLICATIONS

Burnicki, A. C. et al., Simulating error propagation in land-cover change analysis—The implications of temporal dependence, Computers, Environment and Urban Systems (2006).*

Michael B Gousie: "Digital Elevation Model Error Detection and Visualization", The 4th Workshop on Dynamic & Multi-Dimensional GIS, (Jan. 1, 2005), pp. 42-46.*

Hebeler, F; Purves, R S (2008). Modelling DEM data uncertainties for Monte Carlo simulations of ice sheet models. In: Stein, Al; Shi, J; Bijker, W. Quality Aspects in Spatial Data Mining. Boca Raton, 175-196. ISBN 978-1-4200-6926-6.*

Juha Oksanen, Digital Elevation Model Errorin Terrain Analysis, Academic Dissertation in Geography Faculty of Science, 2006 University of Helsinki.*

Tomaz Podobnikar, Methods for visual quality assessment of a digital terrain model, S.A.P.I.EN.S [Online], 2.2 |2009, Online since Jan. 29, 2009.*

Michael B Gousie: "Digital Elevation Model Error Detection and Visualization", The 4th Workshop on Dynamic & Multi-Dimensional GIS.*

Gousie, "Digital Elevation Model Error Detectgion and Visualization," *The 4ht Workshop on Dynamic & Multi-Dimensional GIS*, 42-46 (http://cs.wheatoncollege.edu/~mgousie/gousie_dmgis05.pdf) (2005).

Search Report issued in EP application No. 11306758 (2013).

* cited by examiner

METHOD FOR DETERMINING A LOCALIZATION ERROR IN A GEOREFERENCED IMAGE AND RELATED DEVICE

BACKGROUND

The present invention relates to a method for determining a localization error for a point of raw image, each point of the raw image with image coordinates in the raw image being associated with announced terrain coordinate values defining the geographical localization of an object represented by the point of the raw image; the method comprising the following steps:

providing an exposure function associating each point of the raw image with corresponding terrain coordinates, the exposure function using the magnitudes having a known probability law as parameters of the magnitudes depending on the exposure conditions of the raw image, the magnitudes having a known probability law;

providing a terrain model connecting the terrain coordinates to one another; and deducing, from the exposure function and the terrain model, at least one localization function giving, for a given point of the raw image, at least some of the terrain coordinates for localizing the object shown by the point of the raw image as a function of the magnitudes depending on the exposure conditions of the raw image.

An image from an observation sensor is said to be georeferenced when it is provided accompanied by a mathematical function making it possible to perform a match between the points of the image and the geographical coordinates of the corresponding points in the visualized three-dimensional world. Two types of georeferenced images exist: raw images, coming directly from the observation sensor, and reprocessed images, in particular orthorectified, also called orthoimages, which have in particular been corrected for the effects of the relief of the visualized terrain, and which assume that at each point of the image, the observation point is at the vertical of the corresponding point of the terrain. Thus, an orthorectified image is an image whereof the geography has been corrected so that each of its points can be superimposed on a corresponding flat map.

Any object seen in a georeferenced image can thus be localized in the visualized three-dimensional world, also called terrain. This localization is, however, tainted by errors, due in particular to uncertainties about the parameters of the observation sensors having acquired the image.

For many applications, such as remote sensing or digital geography, it is important to know the precision of the georeferencing of a georeferenced image.

To that end, some suppliers of georeferenced images provide their images accompanied by an indication of the average localization error. This average localization error is uniform over the entire image. It may for example be determined using so-called "control" points, which are characteristic points of the landscape that one can recognize in the images, and whereof a priori one know the geographical localization with great precision. Thus, the average localization error is determined by comparing the geographical coordinates of said points indicated in the georeferenced image with the actual geographical coordinates of those points and averaging the errors obtained for each check point.

The indication of such an average error is not, however, fully satisfactory. In fact, the error varies greatly within images, in particular due to the exposure circumstances and the relief of the visualized terrain. The indication of an average uniform error over the image is therefore not relevant.

Furthermore, the indicated average error does not take uncertainties on the representation of the land surface used into account to perform the georeferencing.

Thus, the announced error is both very imprecise and uncontrolled.

One aim of the invention is to provide a method making it possible to determine, for each point of a georeferenced image, the error affecting the localization of that point without using the error attached to other points of the image.

To that end, the invention relates to a method for determining a localization error as defined above, characterized in that it also comprises the following steps:

estimating, using the probability law of the magnitudes and at least one localization function applied for the image coordinate point of the raw image, the value of a statistical magnitude characteristic of a probability law of at least one of the terrain coordinates associated with the point of the raw image; and deducing the localization error of the point of the raw image from the value of the statistical magnitude.

According to specific embodiments, the method according to the invention comprises one or more of the following features, considered alone or according to all technically possible combinations:

the statistical magnitude is representative of the dispersion of at least one terrain coordinate around its announced value;

the statistical magnitude is a magnitude chosen in the group consisting of the standard deviation and the quantile values of the distribution of the localization error, in particular a value at n %, such as the median or the value at 90%;

the terrain model is provided with an error model whereof the probability law is known, the Monte Carlo method is used, with the help of the probability law of the error model of the terrain model, to generate a set of observations of the terrain model so that that set obeys the probability law of the error model, and each localization function corresponds to a Monte Carlo draw of the terrain model;

the terrain model does not have an error model, and a localization function is accurately deduced from the exposure function and the terrain model;

to estimate the statistical magnitude:

a set of observations is generated for each of the magnitudes so that at least the average and the covariance matrix of that set are equal to the expected value and the covariance matrix of the magnitudes, respectively;

that set of observations is propagated through at least one localization function to obtain at least one set of observations of at least one terrain coordinate;

an estimate of the statistical magnitude representative of the probability law of the at least one terrain coordinate is deduced therefrom;

the statistical magnitude is estimated using the Monte Carlo method, by;

generating, using the probability laws of the magnitudes, a set of observations of each of the magnitudes, so that that set obeys the probability law of the magnitudes;

propagating that set of observations through at least one localization function to obtain at least one set of observations for the at least one terrain coordinate;

estimating the probability law of the at least one terrain coordinate from said at least one set of observations of the at least one terrain coordinate;

deducing the statistical magnitude from the estimated probability law of the at least one terrain coordinate;

the expected value of each of the magnitudes and a covariance matrix of the magnitudes being known, the statistical magnitude is estimated using the sigma points method, by:

choosing a set of sigma points, each given a weight, each sigma point constituting an observation of each of the magnitudes, the set of sigma points being chosen so that the expected value and the covariance calculated by weighted average from that set of sigma points respectively correspond to the expected value and the covariance matrix of the magnitudes;

propagating that set of observations through the at least one localization function to obtain at least one set of observations of the at least one terrain coordinate; and estimating the statistical magnitude from the at least one set of observations of the at least one field coordinate;

the expected value and a covariance matrix of the magnitudes being known, the statistical magnitude is estimated by:

linearizing the localization function to obtain a linearized localization function around a considered point; and obtaining an estimate of the expected value of the at least one terrain coordinate by calculating the result of the expected value of the magnitudes using the localization function;

obtaining an estimate of the covariance matrix of at least some of the terrain coordinates by calculating the result of the covariance matrix of the magnitudes using the linearized localization function;

estimating the statistical magnitude from the expected value of the at least one terrain coordinate and the covariance matrix of the terrain coordinates;

the method as defined above is implemented for each point of the raw image.

The invention also relates to a method for determining a localization error of a point of a georeferenced image, built from at least one raw image, the method comprising the following steps:

determining an image coordinate point of one of the raw images from which the point of the georeferenced image was built;

implementing the method for determining a localization error as defined above, applied to the point of the raw image determined in the previous step, the considered raw image being the raw image to which said determined point of the raw image belongs, so as to determine the localization error of the point of the raw image;

deducing, from the localization error of the point of the raw image, the localization error of the point of the georeferenced image built from the raw image;

the georeferenced image is an orthorectified image;

the step for determining the point of the raw image corresponding to the orthorectified image comprises the following sub-steps:

supplying a terrain model connecting the field coordinates to one another;

supplying an exposure function associating each point of the raw image with corresponding terrain coordinates, the exposure function using the magnitudes as parameters; and determining the point of the raw image corresponding to the point of the orthorectified image using the terrain model and the exposure function;

the method for determining the localization error is implemented for each point of the georeferenced image built from the at least one raw image.

The invention also relates to a device for determining a localization error of a point of a raw image, the raw image being georeferenced, each point of the raw image with image coordinates in the raw image being associated with announced terrain coordinate values defining the geographical localization of the object represented by the point of the raw image;

the device comprising:

means for supplying an exposure function associating each point of the raw image with corresponding terrain coordinates, the exposure function using the magnitudes depending on the exposure conditions of the raw image as parameters, the magnitudes having a known probability law;

means for supplying a terrain model connecting the terrain coordinates to one another;

means for deducing, from the exposure function and the terrain model, at least one localization function yielding, for a given point of the raw image, at least some of the terrain coordinates for localizing the object represented by the point of the raw image as a function of magnitudes depending on the exposure conditions of the raw image, the magnitudes having a known probability law, the device being characterized in that it also comprises:

means for estimating, using at least one localization function applied for the image coordinate point of the raw image and the probability law of the magnitudes, the value of a statistical magnitude characteristic of a probability law of at least one of the terrain coordinates associated with the point of the raw image; and means for deducing the localization error of the point of the raw image from the value of the statistical magnitude.

The invention also relates to a device for determining a localization error of a point of a georeferenced image, built from at least one raw image, the device comprising:

means for determining an image coordinate point of one of the raw images from which the point of the georeferenced image was built;

a determination device as defined above, which is able to determine a localization error of the point of the raw image determined by the means to determine an image coordinate point of one of the raw images from which the point of the georeferenced image was built, the considered raw image being the raw image to which said point belongs;

means for deducing, from the localization error of the point of the raw image, the localization error of the point of the georeferenced image built from the raw image.

BRIEF DESCRIPTION OF THE DRAWINGS

The invention will be better understood upon reading the following description, provided solely as an example and done in reference to the appended drawings, in which.

Figure 1:
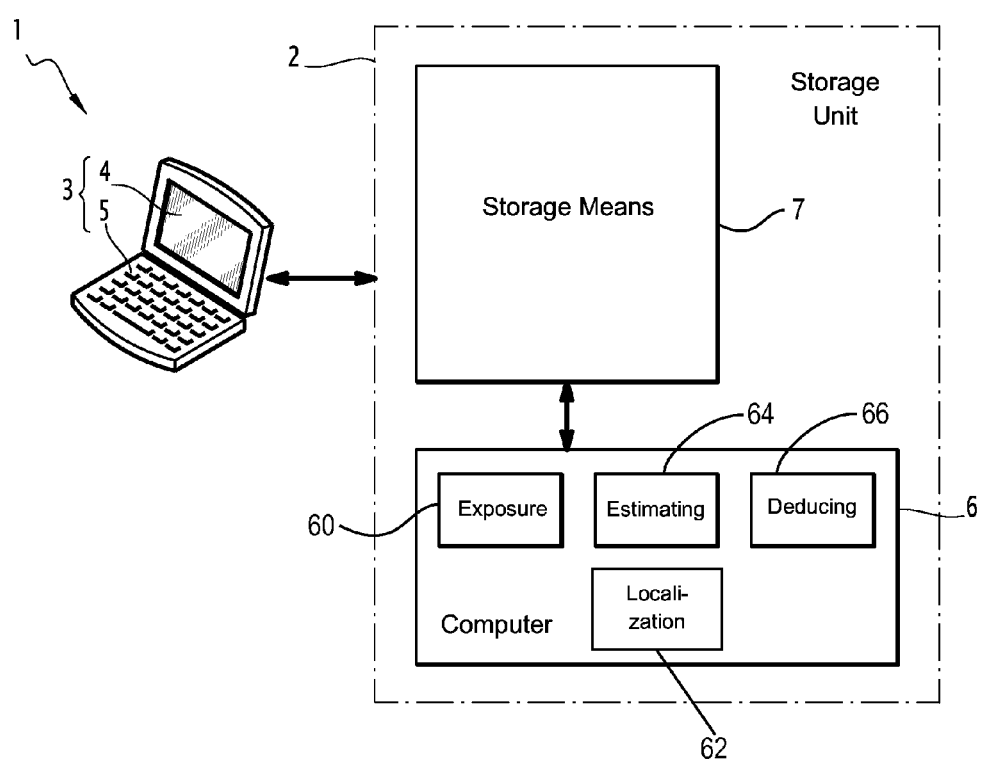
FIG. 1 illustrates a device for determining a localization error.

The geographical localization of a point P in the terrain T is defined by terrain coordinates X, Y, Z. The terrain coordinates X, Y, Z can be defined in any coordinate system adapted to define the localization of an object in the terrain T. Traditionally, one can cite Euclidian referentials such as the 3D Euclidian referential centered on the center of the earth, or one can cite systems of geographical coordinates where the planimetric coordinates are angular over a reference ellipsoid representing the earth (latitude and longitude coordinates) and the altimetric coordinate is linear and measured along the local normal at the reference ellipsoid at the considered point, then lastly one can also cite systems of projected coordinates, not Euclidian but metric, where the planimetric coordinates are expressed in meters, translated into geographical coordinates using a projection formula, usually compliant (for example Mercator, Mercator Transverse, or Universal Transverse Mercator projections, Lambert conical projection, stereographic projection, etc.) and where the vertical coordinate is built as for the aforementioned geographical referentials (latitude, longitude, height). It should be noted that it is possible to change references, Euclidian, geographical or cartographical, without changing the substance of the invention. To summarize and for the strict purposes of the invention, it suffices to consider a trio of numbers X, Y, Z that uniquely determine the localization of any point on the land surface. Hereafter, these coordinates will be called terrain coordinates.

In the rest of the description, the terrain coordinates X, Y, Z are geographical coordinates, in particular comprising planimetric coordinates X, Y and an altimetric coordinate Z.

The image for which one wishes to determine the localization error is a georeferenced image, i.e. each point of the image is associated with announced values $x_T$, $y_T$, $z_T$ of the terrain coordinates, which define the geographical localization in the terrain T of the object represented by that point of the image. Thus, one associates a point P of the terrain with coordinates $x_T$, $y_T$, $z_T$ at each point of the georeferenced image.

The localization error refers to the error on the localization of a point of the image in the terrain T. This error primarily results from uncertainties related to:

(i) the observation sensor; and (ii) the knowledge available about the representation of the land surface, in other words the mathematical relationship defining the land, said relationship either implicitly or explicitly connecting the coordinates X, Y, Z of the points of the land surface. This relationship is hereafter called the terrain model M. It is expressed as follows: M(X,Y,Z)=0 or more traditionally M(X,Y)=Z.

The localization error is expressed, for each point of the image, in units of length, for example in meters, around the announced land coordinates, i.e. around the geographical localization announced for that point.

FIG. 1 shows a device 1 for determining the localization error ϵ of a point of a georeferenced image. According to one embodiment, the device 1 comprises a processing and storage unit 2 and interface means 3 between said unit 2 and a user. The interface means 3 comprise a display device 4, for example a screen, and input peripherals 5, for example a mouse and/or keyboard. The interface means 3 are connected to the processing and storage unit 2 and for example allow the user to act on an image displayed via the display device 4. The processing and storage unit 2 comprises a computer 6, for example a microprocessor of a computer implementing a program and storage means 7, for example a memory of the computer.

The steps of the method for determining the localization error are carried out by the device 1 under the control of the computer program.

In a first embodiment of the invention, the considered image is a raw image $A_0$. The raw image $A_0$ is traditionally an image coming directly from an observation sensor without any geometric preprocessing. The observation sensor used to acquire the raw image $A_0$ may be of any type. It is in particular a radar, lidar, infrared or electro-optical sensor, or a multispectral or hyperspectral vision sensor. Such sensors are for example incorporated into observation satellites, reconnaissance drones, photo devices, or onboard airplanes.

Figure 2:
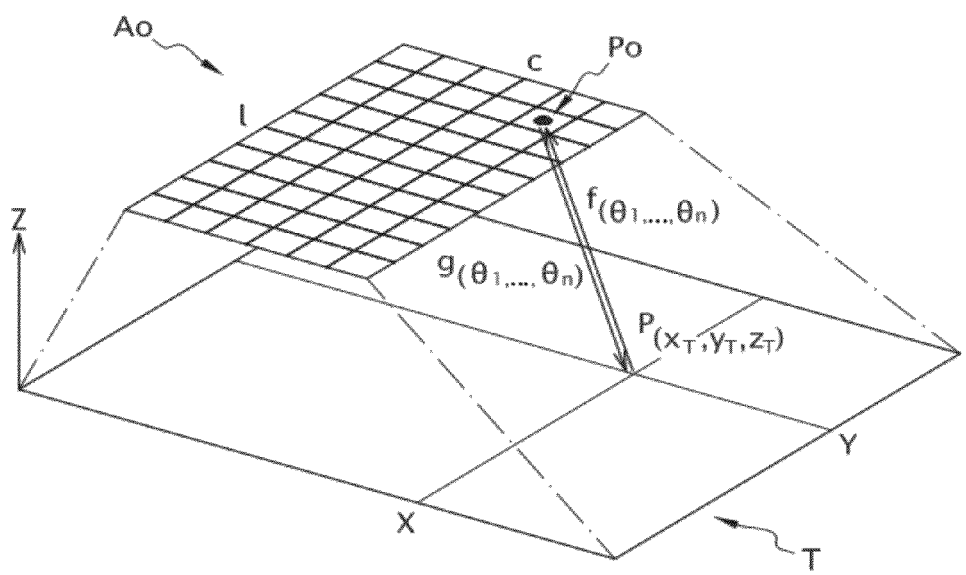
FIG. 2 is a diagrammatic illustration of the relationship between a raw georeferenced image and the terrain.

Each point $P_0$ of the raw image $A_0$ is identified within the raw image $A_0$ by image coordinates l, c defining its position in the raw image $A_0$. The values of the image coordinates l, c are real numbers. As illustrated in FIG. 2, each point $P_0$ of the raw image $A_0$ is associated with an announced value $x_T$, $y_T$, $z_T$ of each geographical coordinate defining the geographical localization of the object represented by the point $P_0$ of the raw image $A_0$ in the terrain T. Thus, in a georeferenced raw image $A_0$, each point $P_0$ is associated with a point P of the terrain T with coordinates $x_T$, $y_T$, $z_T$.

Figure 3:
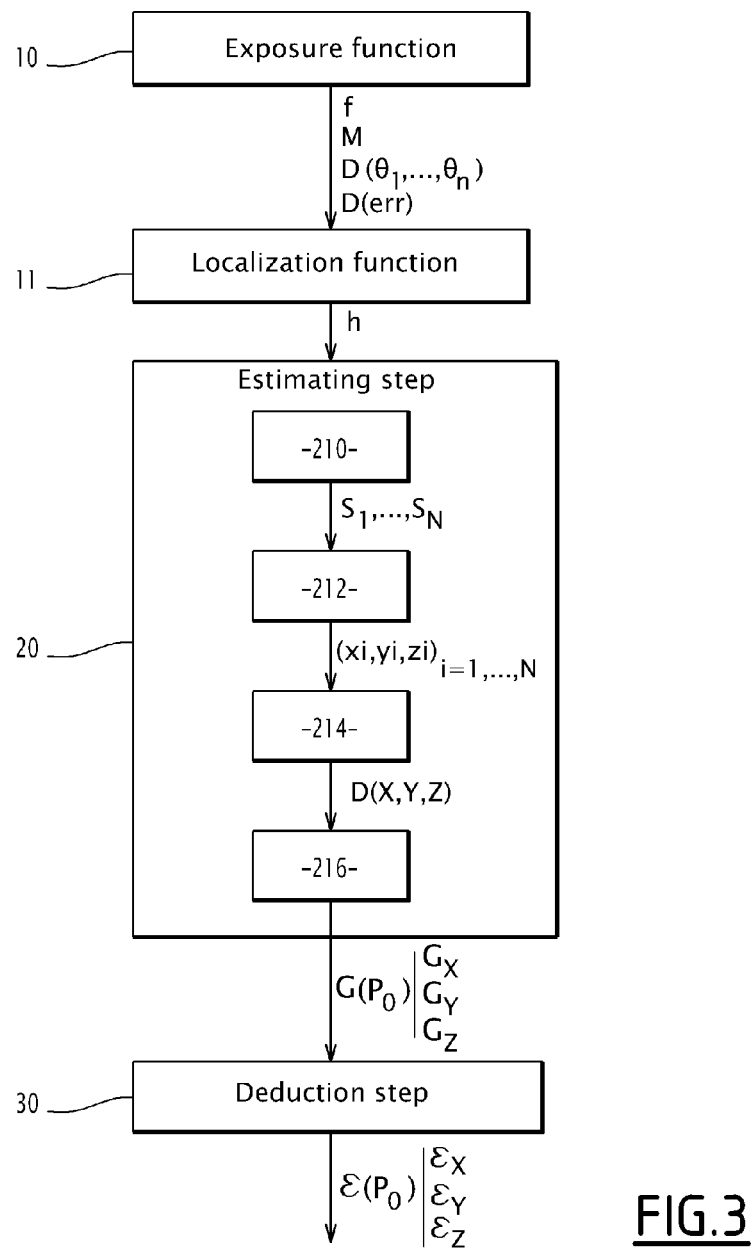
FIG. 3 is a diagrammatic illustration of the method for determining a localization error according to a first embodiment.

FIG. 3 diagrammatically illustrates the method for determining the localization error of the point $P_0$ of the raw image $A_0$, this method for example being carried out by the device 1 under the control of the computer program.

In one step 10 of the method, an exposure function f is provided associated with the raw image $A_0$, as well as a terrain model M as defined above.

The exposure function f is a nonlinear function. It associates the point P of geographical coordinates X, Y, Z in the terrain T with the point $P_0$ corresponding to the raw image $A_0$ with coordinates l, c in the raw image $A_0$. It is expressed as follows:

$$f_{(\theta_1,\ldots,\theta_n)}(X,Y,Z)=(l,c),$$

where

X, Y and Z are the geographical coordinates of the point P of the terrain T;

c and l are the coordinates of the corresponding point $P_0$ in the raw image $A_0$; and $\theta_1, \ldots, \theta_n$ are magnitudes depending on the exposure conditions.

Hereafter, vector $\theta$ refers to the vector whereof the components are the magnitudes $\theta_1, \ldots, \theta_n$. Thus, $\theta=(\theta_1, \theta_2, \ldots, \theta_n)$. Geographical localization vector V also refers to the vector whereof the coordinates are the geographical coordinates X, Y, Z. Thus, V=(X, Y, Z).

The magnitudes $\theta_1, \ldots, \theta_n$ are random variables whereof the joint probability law $D(\theta_1, \ldots, \theta_n)$ is known. The joint law $D(\theta_1, \ldots, \theta_n)$ is either provided by the producer of the raw image $A_0$, or can be deduced by the computer 6 from information provided by the producer of the raw image $A_0$.

Thus, the producer of the raw image $A_0$ for examples provides the type of the joint law, as well as the order 1 and 2 moments, i.e. the expected value of the law, accompanied by uncertainty data generally in the form of a covariance matrix of the magnitudes $\theta_1, \ldots, \theta_n$.

In the case where the magnitudes $\theta_1, \ldots, \theta_n$ are independent and identically distributed random variables, the uncertainty data are for example the standard deviation or the variance of each magnitude $\theta_1, \ldots, \theta_n$ around its expected value.

In the case where the probability law $D(\theta_1, \ldots, \theta_n)$ is not provided, the vector $\theta$ is assumed to be a Gaussian vector, i.e. where any linear combination of the variables $\theta_1, \ldots, \theta_n$ follows a Gaussian law. In that case, the order 1 and 2 moments for each variable $\theta_1, \ldots, \theta_n$ suffice to define the joint probability law under that Gaussian hypothesis.

In the context of the method according to the invention, all of the magnitudes $\theta_1, \ldots, \theta_n$ are random variables. The invention makes it possible to incorporate the constants. They are then defined by the zero coefficients in the covariance matrix in the row and column concerning them.

The magnitudes $\theta_1, \ldots, \theta_n$ for example comprise positioning characteristics of the observation sensor during the acquisition of the raw image $A_0$, such as its position and its orientation during the acquisition of the raw image $A_0$, as well as the physical characteristics of the observation sensor having acquired the raw image $A_0$, such as the size of the receiving matrices or the focal distance.

The geographical localization coordinates X, Y and Z for the point P of the terrain T associated with the point $P_0$ of the raw image $A_0$ depend on the magnitudes $\theta_1, \ldots, \theta_n$ in particular via the exposure function f. These geographical coordinates X, Y and Z are therefore random joint law variables $D(X, Y, Z)$. The announced values $x_T$, $y_T$ and $z_T$ of the geographical coordinates associated with the point $P_0$ in the georeferenced raw image $A_0$ constitute particular observations of the geographical coordinates X, Y and Z.

The exposure function f of a raw image $A_0$ is generally provided with the raw image $A_0$.

The exposure function f is, according to one embodiment, a physical exposure model, which is a direct translation of the exposure of the sensor. Examples of exposure models are the conical model, which corresponds to a CCD or CMOS receiver array and represents the traditional exposure of a focal plane camera, the pushbroom model, which represents a sensor in which the receivers are organized along a one-dimensional strip, and the whiskbroom model, which represents a sensor in which the receiver is reduced to a cell whereof the rapid movement makes it possible to form an image.

Alternatively, the exposure function f is a purely analytical replacement model. In that case, the magnitudes $\theta_1, \ldots, \theta_n$ are not each directly related to a physical parameter of the exposure, as is the case in the physical exposure model, but are translated in their entirety from the exposure conditions by the producer of the replacement model. Examples of replacement models are traditionally the polynomial model, the rational fraction model, or the grid model. For this type of model, the producer provides a covariance matrix for the vector $\theta$.

The terrain model M provided in step 10 provides, in the described embodiment, for any point P of the terrain T, the altimetric coordinate Z as a function of the planimetric coordinates X and Y. It is provided with an error model err(X,Y), modeling the error of the terrain model M as a random field whereof the probability law D(err) is known.

Thus, the terrain model M, with its error err(X,Y), is expressed as follows:

$$Z = M(X, Y) + \text{err}(X, Y),$$

where
Z is the altimetric coordinate of a point P of the terrain T,
X and Y are the planimetric coordinates of that point P,
err(X,Y) is the error of the terrain model M.

The terrain model M is for example a digital surface model (DSM) or a digital elevation model (DEM), these two models providing relief information relative to the ground surface. Alternatively, it is a digital terrain model (DTM), which provides relief information relative to the bare soil. In the most terrain information-poor cases, this terrain model M may be reduced to a land geoid, i.e. an equipotential of the earth gravity field coinciding with the average sea level, or a simple geometric model of the earth that can be either ellipsoid in revolution, such as, for example, the "WGS84" World Geodetic System produced by the American National Imagery Mapping Agency (NIMA) or a simple sphere with an average earth radius or even a so-called flat earth model where the function M is constant.

The error field err(X,Y) being a priori any relationship of the error law D(err), it will subsequently be modeled using Monte Carlo draws of the earth model M and for each draw, the earth error will be integrated into the drawn model M. To that end, using the Monte Carlo method, and using the probability law D(err) of the error model err(X,Y), a set of observations of the terrain model M are generated such that that set obeys the probability law D(err) of the error model err(X,Y). These Monte Carlo draws are for example done using an algorithm based on Fourier transform methods.

The terrain model M as traditionally provided by a data producer is a particular case. It corresponds to the identically zero production of the error field err(X,Y).

In step 11 of the method, the exposure function f is reversed using any suitable method, for example using the ray-tracing method, using the terrain model M, so as to obtain a localization relationship h.

To that end, the following system is implicitly resolved, the image coordinates l, c of the point $P_0$ of the raw image $A_0$ being set:

$$f_{(\theta_1, \ldots, \theta_n)}(X, Y, Z) = (l, c).$$

The localization relationship h is modeled as depending on a random field. Each performance of the localization relationship h is called localization function g. Each localization function g corresponds to a performance of the error field err(X,Y), i.e. for example a particular Monte Carlo draw of the error field err(X,Y).

The localization relationship h implicitly contains, due to its attainment method, the terrain model M in the hypothesis that a Monte Carlo draw of the error field err(X,Y) of the terrain model M has been done.

Each localization function g, i.e. each performance of the localization relationship h, is a function that is not necessarily linear. It gives, for each point $P_0$ of the raw image $A_0$, at least some of the geographical localization coordinates X, Y, Z associated with that point $P_0$ as a function of the magnitudes $\theta_1, \ldots, \theta_n$ depending on the exposure conditions. In particular, each localization function g gives, for each point $P_0$ of the raw image $A_0$, the three geographical localization coordinates X, Y, Z associated with that point $P_0$ as a function of the magnitudes $\theta_1, \ldots, \theta_n$ depending on the exposure conditions.

In step 20 of the method, one estimates, for the point $P_0$ of coordinates l, c of the raw image $A_0$, the value of a characteristic statistical magnitude G of the probability law D(X, Y, Z) of the geographical coordinates X, Y, Z associated with the point $P_0$ of the raw image $A_0$ using:
- the probability law $D(\theta_1, \ldots, \theta_n)$ of the vector $\theta$; and
- at least one of the localization functions g, the or each localization function g being applied to the point $P_0$ with coordinates l, c of the raw image $A_0$. Each localization function g corresponds to a particular performance of the localization relationship h, i.e. a given Monte Carlo draw of the terrain error err(X, Y).

Advantageously, one estimates the statistical magnitude G from each localization function g obtained by Monte Carlo draws of the terrain error err(X, Y).

The statistical magnitude G for example comprises a component $G_X$, $G_Y$, $G_Z$ according to each of the geographical coordinates X, Y, Z. It is representative of the dispersion of the geographical coordinates X, Y and Z around their respective announced values $x_T$, $y_T$, $z_T$.

It comprises, according to one embodiment, the standard deviation of each of the geographical coordinates X, Y and Z around their respective announced values $x_T$, $y_T$ and $z_T$. For geographical coordinate X, the standard deviation is for example calculated using the formula:

$$G_X = \sqrt{\frac{1}{n} \times \sum_{i=1}^{n} (x_i - x_T)^2},$$

where
$x_i$ is an observation of the geographical coordinate X;
$x_T$ is the announced value of the geographical coordinate X;
n corresponds to the number of observations made.

The standard deviation is calculated similarly for geographical coordinates Y and Z.

According to alternatives or optionally, other statistical magnitudes G can be calculated among all of the well-known dispersion indicators. These include the very used statistical order criteria corresponding to the errors at n %, where n is comprised between 0 and 100. The error at 50% is called median, and the value at 90% is often used. The traditional manner of calculating these is well known by those skilled in the art (for example by sorting the errors and calculating the maximum of the errors among the smallest n %).

Alternatively or optionally, the statistical magnitude G comprises a planimetric component $G_P$, representative of the dispersion of the planimetric coordinates X and Y around their announced values $x_T$, $y_T$, and an altimetric component $G_Z$, representative of the dispersion of the altimetric coordinate Z around its announced value $z_T$.

According to the first embodiment, the statistical magnitude G is estimated for the point $P_0$ of the raw image $A_0$ using the Monte Carlo method, by setting up Monte Carlo draws according to the laws of the magnitudes $\theta_1, \ldots, \theta_n$ through at least one localization function g.

To that end, in a sub-step 210 of step 20, one generates, using the probability law $D(\theta_1, \ldots, \theta_n)$ of the vector $\theta$ provided in step 10, a set of N observations $S_1, \ldots, S_N$ of the vector $\theta$. The observations $S_1, \ldots, S_N$ are chosen using algorithms known by those skilled in the art so that the set of observations $S_1, \ldots, S_N$ obeys the probability law $D(\theta_1, \ldots, \theta_n)$ of the vector $\theta$. These algorithms are for example algorithms based on the acceptance-rejection method or on Markov process-based methods, these methods being well known by those skilled in the art.

The size of the set, i.e. the number N of observations $S_1, \ldots, S_N$, is chosen by one skilled in the art, in particular as a function of the desired precision of the estimate and the number n of magnitudes $\theta_1, \ldots, \theta_n$, i.e. the dimension of the vector $\theta$. The number N of observations of the vector $\theta$ is traditionally greater than 1000.

In a sub-step 212 of step 20, one determines, for the point $P_0$ of the raw image $A_0$ with given coordinates l, c, the results of each of the N observations $S_1, \ldots, S_N$ using at least one localization function g. Each result corresponds to an observation $x_i$, $y_i$, $z_i$ of the geographical coordinates X, Y, Z. One thus obtains, at the end of step 212, a set of N observations $x_i$, $y_i$, $z_i$ of the geographical coordinates X, Y, Z for each localization function g. Alternatively, one obtains a set of observations $x_i$, $y_i$, $z_i$ of the geographical coordinates X, Y, Z for all of the localization functions g obtained by Monte Carlo draws of the terrain error err(X, Y).

In a sub-step 214 of step 20, one estimates the probability law D(X, Y, Z) of the coordinates X, Y and Z from the observation set(s) $x_i$, $y_i$ and $z_i$ of the geographical coordinates X, Y, Z obtained in sub-step 212.

In a sub-step 216 of step 20, one deduces the statistical magnitude G of the probability law D(X, Y, Z) of the geographical coordinates X, Y and Z. In particular, one deduces each of the components $G_X$, $G_Y$, $G_Z$ of the statistical magnitude G relative to the geographical coordinate X, Y, Z, respectively, of the probability law D(X, Y, Z).

Optionally, one also deduces the expected results E(X), E(Y) and E(Z) of the geographical coordinates X, Y, Z of the probability law D(X, Y, Z).

In step 30, one deduces, from the value of the statistical magnitude G, the localization error $\epsilon$ of the point $P_0$ of the raw image $A_0$. According to one embodiment, the geographical localization error $\epsilon$ is identified, for each geographical coordinate X, Y, Z, with the corresponding component $G_X$, $G_Y$, $G_Z$ of the statistical magnitude G determined in step 20.

According to one alternative, the localization error $\epsilon$ comprises a planimetric component $\epsilon_p$, dependent on the planimetric coordinates X and Y. This planimetric component is for example obtained from the components $G_X$ and $G_Y$ of the statistical magnitude G respectively relative to the planimetric coordinates X and Y determined in step 20, by applying the following formula: $G_p = \sqrt{G_X^2 + G_Y^2}$. Alternatively, it is obtained directly from the planimetric component $G_p$ of the statistical magnitude G.

Optionally, the localization error $\epsilon$ also comprises an altimetric component $\epsilon_Z$ depending on the altimetric coordinate Z. The altimetric component $\epsilon_Z$ is for example identified with the component $G_Z$ of the statistical magnitude G relative to the altimetric coordinate Z determined in step 20.

Advantageously, the probability law D(X, Y, Z) of the geographical coordinates X, Y, Z is recorded, associated with the point $P_0$, for example in the storage means 7.

Alternatively or optionally, the statistical magnitude G associated with the point $P_0$, for example the standard deviation of the geographical coordinates X, Y, Z around their announced values $x_T$, $y_T$, $z_T$, is recorded. Optionally, the expected values E(X), E(Y) and E(Z) of the geographical coordinates X, Y, Z are also recorded.

Advantageously, steps 10 to 30 are implemented for each point $P_0$ of the raw image $A_0$ so as to determine the localization error $\epsilon$ of each point $P_0$ of the georeferenced raw image $A_0$.

The establishment of Monte Carlo draws of the error field err(X,Y) of the terrain model M improves the precision of the estimate of the localization error $\epsilon$, since the estimated error takes the error on the terrain model M into account.

Furthermore, using the Monte Carlo method makes it possible to obtain a good estimate of the probability laws of the geographical coordinates X, Y and Z. It does, however, require a significant number of calculations, and therefore requires a lengthy calculation time.

The method according to a second embodiment only differs from the method according to the first embodiment in that the terrain error err(X,Y) is not taken into account. In other words, it is considered that the error on the terrain model M is zero. In that case, Monte Carlo draws are not performed on the terrain error err(X,Y), i.e. the probability law D(err) is considered identically zero. In that case, the localization relationship h determined in step 11 is deterministic. It is called localization function g. All of the other steps are identical to the steps of the method according to the first embodiment, except that they are applied to the single localization function g, rather than to the plurality of localization functions g.

Figure 4:
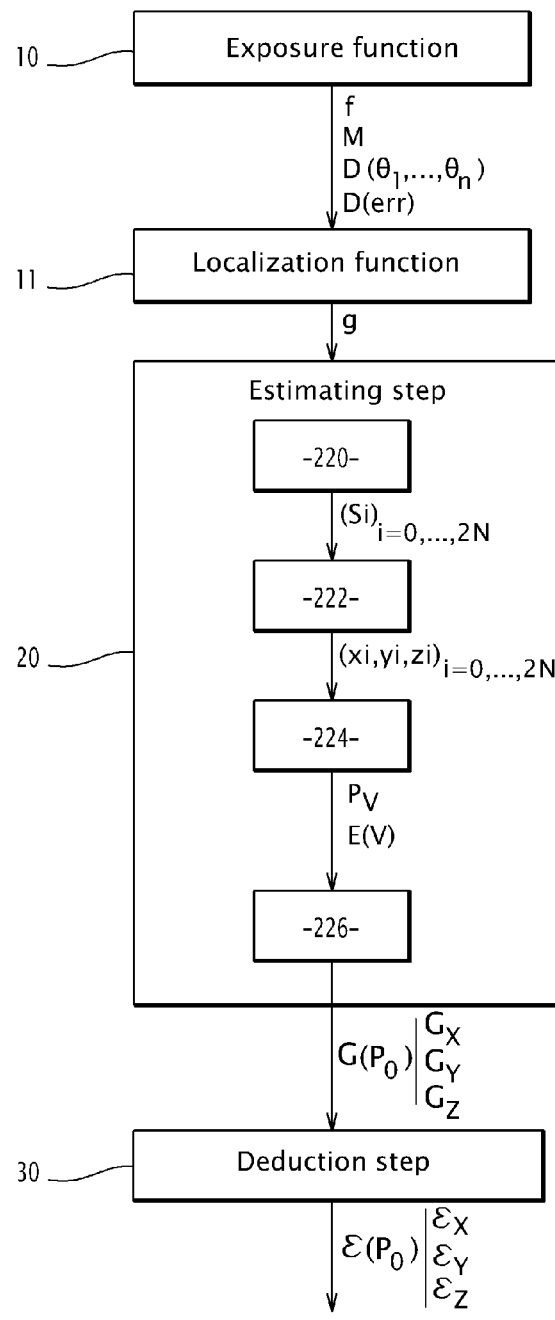
FIG. 4 is a diagrammatic illustration of the method according to a first alternative of a second embodiment.

The method for determining the localization error $\epsilon$ according to a first alternative of the first and second embodiments is illustrated in FIG. 4. It only differs from the method according to the first and second embodiments of the invention through the method for estimating the statistical magnitude G used in step 20. In fact, in the first alternative, the statistical magnitude G is estimated using the method based on a sigma-point method To that end, in a sub-step 220 of step 20, one chooses a set of sigma points $S_i$, where each sigma point $S_i$ is an observation of the vector $\theta$. Weights $\omega_i^m$ and $\omega_i^c$ are assigned to each sigma point $S_i$. The set of sigma points $S_i$ is chosen so that the average and the covariance matrix calculated by weighted average from these sigma points $S_i$ respectively correspond to the expected value $E(\theta)$ and the covariance matrix $P_\theta$ of the vector $\theta$.

The sigma points $S_i$ are generated iteratively, for example using the following equations:

$$S_0 = E(\theta)$$

$$S_i = E(\theta) + \zeta(\sqrt{P_\theta})_i \text{ for } i=1,\ldots,n$$

$$S_i = E(\theta) - \zeta(\sqrt{P_\theta})_i \text{ for } i=n+1,\ldots,2n$$

where $\zeta$ Is a scalar scale factor that determines the dispersion of the sigma points Si around the expected value $E(\theta)$ of the vector $\theta$;

$(\sqrt{P_\theta})_i$ designates the $i^{th}$ column of the square root of the covariance matrix $P_\theta$.

The values of the scale factor $\zeta$ and the weights im,c depend on the type of sigma point approach used. According to one embodiment, the unscented transformation is used as sigma point approach type. The method for choosing the sigma points $S_i$ using the unscented transformation is known by those skilled in the art, and is in particular described in the article "Sigma-Point Kalman Filters for Probabilistic Inference in Dynamic State-Space Models," Rudolph van der Merwe, PhD Thesis, April 2004. Any other type of sigma point approach may also be used in the context of the inventive method.

In a sub-step 222 of the method according to the first alternative, the sigma points $S_i$ chosen in step 220 are propagated through the localization function g.

To that end, one for example uses the following equations:

$$V_i = g(S_i)$$

$$E(V) \approx \sum_{i=0}^{2L} \omega_i^m V_i$$

$$P_V \approx \sum_{i=0}^{2L} \sum_{j=0}^{2L} \omega_{i,j}^c v_i v_j^T$$

where $\omega_i^m$ and $\omega_i^c$ are scalar weights whereof the value depends on the type of sigma point approach used.

One thus obtains one or several sets of observations $x_i$, $y_i$, $z_i$ of the geographical coordinates X, Y, Z.

One also obtains the covariance matrix $P_V$ of the geographical coordinates X, Y, Z and optionally the expected value E(X), E(Y), E(Z) of each of the geographical coordinates X, Y, Z.

Optionally, one estimates, in a sub-step 224, a covariance matrix P of the planimetric coordinates X, Y from the block extracted from the matrix $P_V$ corresponding to the coordinates X, Y and, optionally, the expected value E(X), E(Y) of each of the planimetric coordinates X and Y. In this sub-step 224, one also estimates the variance of the altimetric coordinate Z from the corresponding diagonal term $P_{v3,3}$ of the covariance matrix $P_V$.

In a sub-step 226, one estimates the statistical magnitude G from the set of observations $x_i$, $y_i$, $z_i$ of the geographical coordinates X, Y, Z, and in particular from the covariance matrix $P_V$. The standard deviation of the geographical coordinate X, Y, Z is then deduced from the square roots of the values of the diagonal of the matrix $P_V$.

In the event one estimates the planimetric statistical magnitude $G_p$ relative to the planimetric coordinates X and Y, one uses the formula:

$$G_p = \sqrt{Pv_{1,1} + Pv_{2,2}},$$

where $P_{V1,1}$ and $P_{V2,2}$ respectively correspond to the diagonal terms of the matrix $P_V$ relative to the geographical coordinate X and the geographical coordinate Y.

The altimetric component $G_Z$ of the statistical magnitude G corresponds to the square root of the diagonal term $P_{v3,3}$ of the matrix $P_V$ relative to the altimetric geographical coordinate Z.

In step 30, the localization error $\epsilon$ is deduced from the statistical magnitude G in the same way as in the first or second embodiments.

The use of the method based on the sigma point approach has the advantage of providing an accurate approximation of the expected value and variants of the geographical coordinates X, Y, Z for an instantaneous calculation time.

Figure 5:
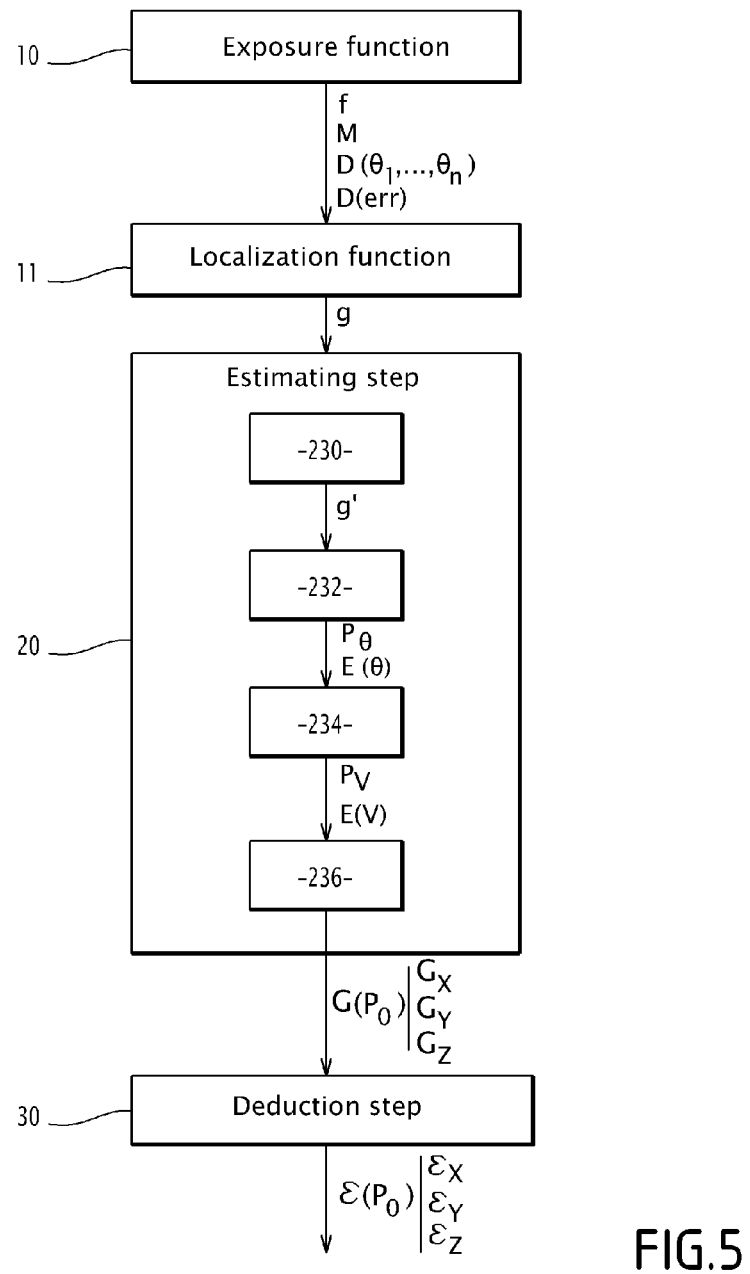
FIG. 5 is a diagrammatic illustration of the method according to a second alternative of the second embodiment.

The determination method according to a second alternative, illustrated in FIG. 5, only differs from the first or second embodiments of the invention through the method for estimating the statistical magnitude G used in step 20. In fact, in the second alternative, the statistical magnitude G is estimated through linearization of the localization function g.

To that end, in a sub-step 230 of step 20, one linearizes the localization function g to obtain a linearized localization function g' around the considered point $\theta$.

In a sub-step 232, one provides or determines, from the probability law $D(\theta_1, \ldots, \theta_n)$ of the vector $\theta$, the covariance matrix $P_\theta$ of the vector $\theta$, and optionally the expected value $E(\theta)$.

In a sub-step 234, the covariance matrix $P_\theta$ is propagated through the linearized localization function g'. To that end, one for example uses the equation:

$$P = \nabla g P_\theta (\nabla g)^T$$

where $\nabla g$ is the gradient of g.

One thus obtains an estimate of the covariance matrix $P_V$ of the geographical coordinates X, Y and Z.

Optionally, in sub-step 234, the expected value $E(\theta)$ of the vector $\theta$ is propagated through the localization function g according to the equation $$\begin{pmatrix} E(X) \\ E(Y) \\ E(Z) \end{pmatrix} = g(E_\theta),$$

where E(X), E(Y) and E(Z) are the expected values of the planimetric coordinates X and Y and altimetric coordinates Z.

One thus obtains an estimate of the expected value E(X), E(Y), E(Z) of each of the geographical coordinates X, Y and Z.

In a sub-step 236, one deduces the statistical magnitude G of the covariance matrix $P_V$ of the geographical coordinates X, Y and Z. The statistical magnitude G in particular comprises the standard deviation of each of the geographical coordinates X, Y and Z around its respective announced value $x_T$, $y_T$ and $z_T$.

This statistical magnitude G is deduced from the covariance matrix $P_V$ in the same way as in the first alternative.

In step 30, the localization error $\epsilon$ is deduced from the statistical magnitude G in the same manner as in the second embodiment.

The method according to the second alternative has the advantage of being faster to implement than the methods according to the first and second embodiments and according to the first alternative. However, the localization error obtained is less precise due to the use of the linearized localization function g'.

The methods according to the first and second alternatives are advantageously implemented as alternatives of the method according to the second embodiment, in which one does not take the error of the terrain model into account.

In the first and second embodiments, as well as in the first and second alternatives, the statistical magnitude G and the localization error $\epsilon$ have been estimated relative to the two planimetric geographical coordinates X, Y and the altimetric geographical coordinate Z or relative to a combination of the planimetric coordinates X and Y.

Alternatively, the statistical magnitude G and the localization error $\epsilon$ are estimated relative only to some of the geographical coordinates X, Y, Z, in particular relative to one or two of those coordinates. In fact, in certain cases, it is not essential to have information on the localization error according to each of the geographical coordinates.

In the case where one uses a different system of coordinates to localize a point P in the terrain T, the statistical magnitude G and the localization error $\epsilon$ are calculated relative to at least one of those coordinates, and for example relative to each of those coordinates or relative to combinations of those coordinates.

The device 1 illustrated in FIG. 1 is capable of implementing the method according to the first embodiment, the second embodiment, or according to the first or second alternatives.

To that end, it comprises means 60 for providing the exposure function f, the terrain model M, the probability law $D(\theta_1, \ldots, \theta_n)$ of the magnitudes $(\theta_1, \ldots, \theta_n)$, and any probability law D(err) of the error field err(X,Y) of the considered terrain model M. These means 60 are incorporated into the computer 6, the engagement function f, the terrain model M, as well as the probability law $D(\theta_1, \ldots, \theta_n)$ of the magnitudes $(\theta_1, \ldots, \theta_n)$, and the probability law D(err) of the error field err(X,Y) of the terrain model M for example being stored in databases in the storage means 7.

The device 1 also comprises:

means 62 for deducing a localization relationship h from the exposure function f and using the terrain model M;

means 64 for estimating, using at least one localization function g applied for the point $P_0$ of image coordinates l,c of the raw image $A_0$ and the probability law $D(\theta_1, \ldots, \theta_n)$ of the magnitudes $\theta_1, \ldots, \theta_n$, the value of the characteristic statistical magnitude G of the probability law D(X,Y,Z) of at least one of the geographical coordinates X, Y, Z associated with the point $P_0$ of the raw image $A_0$; and means 66 for deducing, from the value of the statistical magnitude G, the geographical localization error $\epsilon$ of the point $P_0$ of the raw image $A_0$.

The means 62, 64 and 66 are incorporated into the computer 6 of the processing and storage unit 2.

The storage means 7 in particular comprise the image coordinates l, c defining the position of each point $P_0$ in the raw image $A_0$, the announced values $x_T$, $y_T$, $z_T$ of the geographical coordinates corresponding to each point $P_0$ in the raw image $A_0$, and one or more of the following data: the exposure function f and/or the terrain model M accompanied by its error field err(X,Y).

The determination method described in reference to the first embodiment, the second embodiment, and its first and second alternatives, as well as the related device have the advantage of making it possible to evaluate the localization error at each point of the georeferenced raw image. The estimated localization error thus takes the spatial variability of the localization error into account. Furthermore, the use of the statistical estimation methods described above makes it possible to obtain a precise estimate of the error, despite the non-linearity of the or each localization function. In the event one takes the error field of the terrain model into account, the precision of the statistical estimate of the localization error is improved, since it also takes uncertainties coming from that model into account. Lastly, the localization error is estimated for each point without calling on support points whereof the geographical coordinates are known with certainty. In this way, it can also be calculated for points of raw images acquired in areas in which one does not have support points with known geographical coordinates.

In a third embodiment of the invention, the georeferenced image is a georeferenced image $A_2$ built from one or more raw images $A_0$.

In the following, the georeferenced image is an orthorectified image $A_2$, also called orthoimage, built from the raw image $A_0$ or a plurality of raw images $A_0$.

Figure 6:
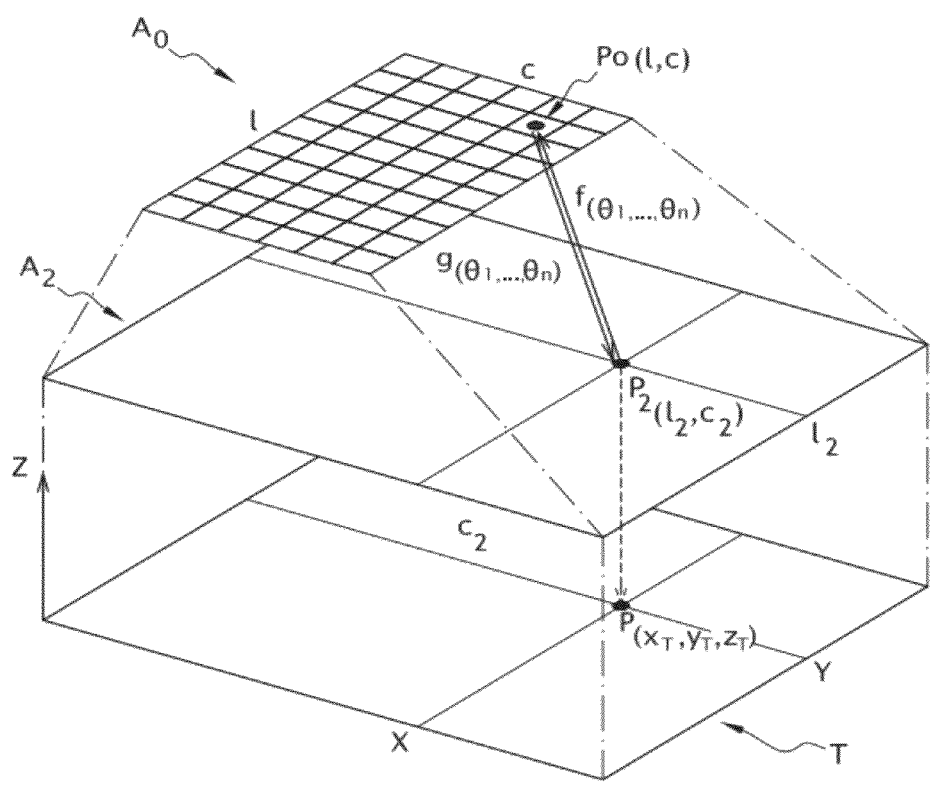
FIG. 6 is a diagrammatic illustration of the relationship between an orthorectified image and a corresponding raw image.
Figure 7:
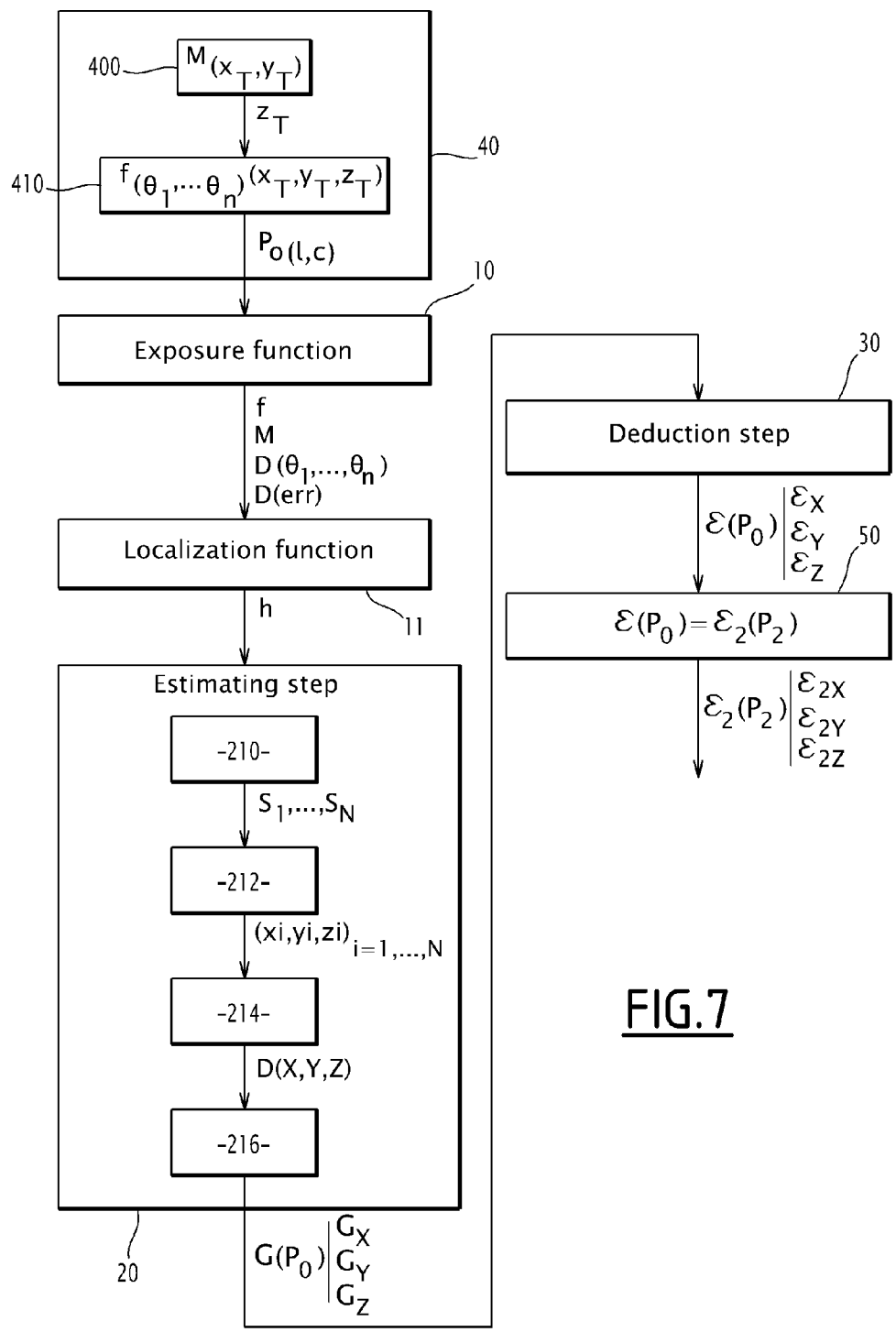
FIG. 7 is a diagrammatic illustration of the method according to a third embodiment.

FIG. 6 illustrates the relationships between the orthorectified image $A_2$, the terrain T and the raw image $A_0$ from which the orthorectified image $A_2$ has been built.

Traditionally, an orthorectified image is an image this has been filtered for the influence of the visualized relief. Its geometry has been rectified so that each point can be superimposed on a corresponding flat map. In other words, it appears to be taken vertically for all points P of the terrain T that it represents, these points P being situated on a perfectly flat terrain; in particular, the scale of an orthorectified image is uniform over the entire image.

The orthorectified image $A_2$ is built, in a known manner, from one or more raw images $A_0$. It comprises points $P_2$, each point $P_2$ being identified within the orthorectified image $A_2$ by coordinates $l_2$, $c_2$ defining its position in the orthorectified image $A_2$. By construction, the values $l_2$, $c_2$ of the coordinates of each point $P_2$ of the orthorectified image $A_2$ correspond to the announced values $x_T$, $y_T$ of the planimetric coordinates defining the geographical localization of the object represented by the point $P_2$ in the terrain T using a bilinear correspondence. The announced value $z_T$ of the altimetric coordinate corresponding to the point $P_2$ of the orthorectified image $A_2$ is obtained using the terrain model M. Thus, the orthorectified image $A_2$ is by nature a georeferenced image whereof the exposure function f is a simple linear function.

The method according to the third embodiment is a method for determining the localization error $\epsilon_2$ of a point $P_2$ of the orthorectified image $A_2$.

In the context of this method, the producer of the georeferenced image $A_2$ provides:
- the exposure function f associated with the or each raw image $A_0$;
- the probability law $D(\theta_1, \ldots, \theta_n)$ of the magnitudes $\theta_1, \ldots, \theta_n$ depending on the capture conditions for the or each raw image;
- the terrain model M, as well as the probability law D(err) of its error field err(X,Y) if any.

The computer 6 then deduces the localization relationship h from the exposure function f and using the terrain model M.

In step 40 of the method according to the third embodiment, one determines the point $P_0$ of the raw image $A_0$ from which the point $P_2$ of the orthorectified image $A_2$ was built.

To that end, in a sub-step 400, one determines, using the terrain model M, in which the terrain error err(X, Y) has been taken to be equal to zero and the announced values $x_T$, $y_T$ of the planimetric coordinates identical by construction to the coordinates $l_2$, $c_2$ of the point $P_2$, the announced value $z_T$ of the altimetric coordinate corresponding to the point $P_2$ of the orthorectified image $A_2$. One thus obtains the announced values $x_T$, $y_T$, $z_T$ of the geographical coordinates defining the geographical localization of the point $P_2$.

In a sub-step 410, one applies the exposure function f to each point $P_2$ of the orthorectified image $A_2$, i.e. to the announced values $x_T$, $y_T$, $z_T$ of the geographical coordinates so as to obtain the values of the coordinates l, c of the point $P_0$ of the corresponding raw image $A_0$. During the application of the exposure function f, one identifies the magnitudes $\theta_1, \ldots, \theta_n$ with their expected values indicated by the producer of the raw image $A_0$.

Thus, at the end of step 40, one has determined the point $P_0$ of the raw image $A_0$ from which the point $P_2$ of the orthorectified image $A_2$ was built, i.e. the point $P_0$ of the raw image $A_0$ corresponding to the point $P_2$ of the considered orthorectified image $A_2$. In that context, the values l, c of the coordinates of the point $P_0$ are real numbers that are not necessarily integers.

At the end of step 40, one applies steps 10, 11, 20 and 30 of the method according to the first embodiment, the second embodiment and its first or second alternatives to the point $P_0$ of the raw image $A_0$ corresponding to the point $P_2$ of the orthorectified image $A_2$ determined in step 40.

At the end of step 30, one has obtained an estimate of the localization error $\epsilon$ of the point $P_0$ of the raw image $A_0$ from which the point $P_2$ of the orthorectified image $A_2$ was built.

In step 50 of the method, one identifies the localization error $\epsilon$ of the point $P_0$ of the raw image $A_0$ with the localization error $\epsilon_2$ of the point $P_2$ of the orthorectified image $A_2$.

Optionally, one reproduces steps 10 to 50 for each point $P_2$ of the orthorectified image $A_2$. One thus obtains the localization error $\epsilon_2$ of each point $P_2$ of the orthorectified image $A_2$.

The method according to the third embodiment has been explained for an orthorectified image $A_2$. The method applies in the same way to any georeferenced image, formed from one or several raw images, on the condition that one is capable of making each point of the georeferenced image correspond to a point of a raw image from which it was built.

Figure 8:
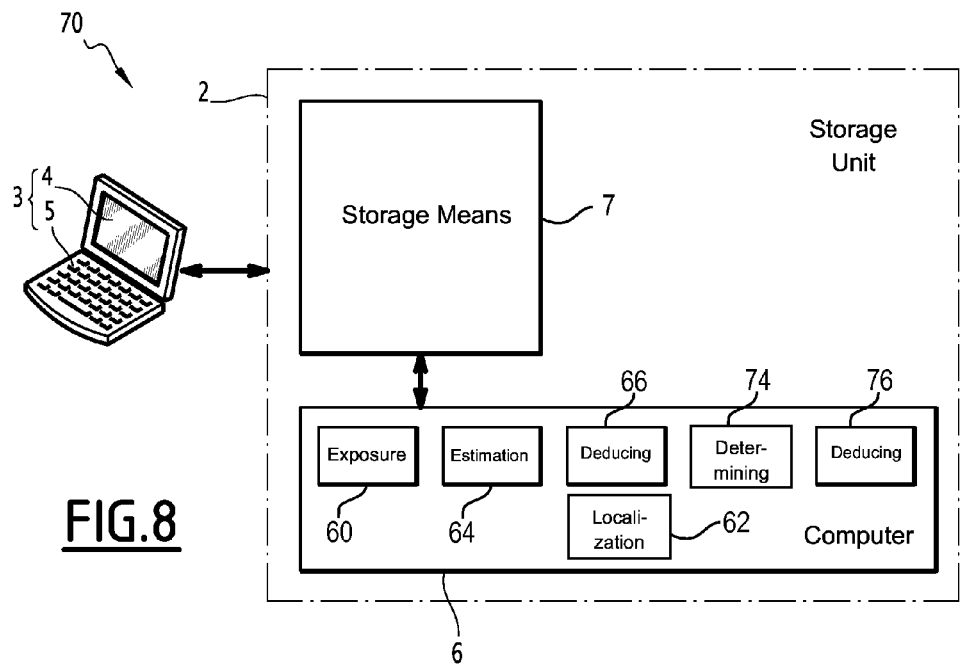
FIG. 8 illustrates a device for determining a localization error according to the third embodiment.

FIG. 8 illustrates a device 70 for determining the localization error of a point $P_2$ of the georeferenced image $A_2$. This device 70 only differs from the device 1 illustrated in FIG. 1 in that it also comprises:
- means 74 for determining a point $P_0$ of coordinates l, c of one of the raw images $A_0$ from which the point $P_2$ of the georeferenced image $A_2$ was built;
- means 76 for deducing the localization error $\epsilon_2$ of the point $P_2$ of the georeferenced image $A_2$ from the geographical localization error $\epsilon$ of the point $P_0$ of the raw image $A_0$.

The means 74 and 76 are incorporated into the computer 6 of the processing and storage unit 2. In that case, the storage means 7 also comprise the coordinates $l_2$, $c_2$ defining the position of each point $P_2$ in the georeferenced image $A_2$, which is in particular an orthorectified image.

The device 70 is thus capable of also carrying out steps 40 and 50 of the method according to the third embodiment under the control of an adapted computer program.

The determination method described in reference to the third embodiment, as well as the related device, have the advantage of making it possible to evaluate the localization error at each point of the georeferenced image built from a raw image, and in particular from an orthorectified image. The estimated localization error thus takes the spatial variability of the localization error into account. Furthermore, the use of the statistical estimation methods described above makes it possible to obtain a precise estimate of the error, despite the nonlinearity of the localization function. Lastly, in the case where one takes the statistical model of the terrain error into account, the estimated localization error also takes the uncertainties coming from the terrain model into account.

Figure 9:
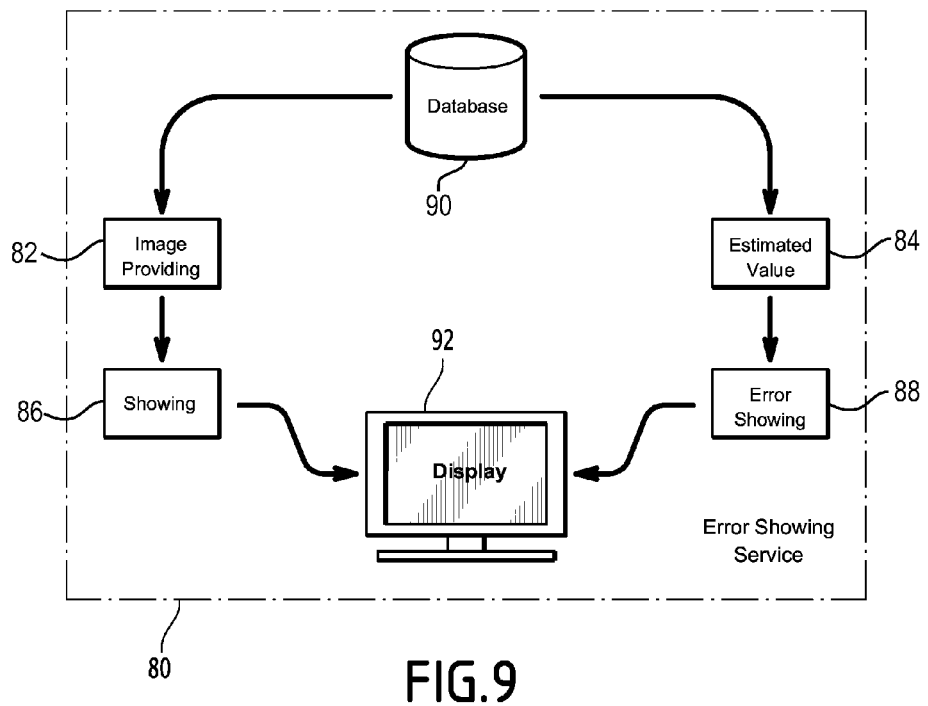
FIG. 9 is a diagrammatic illustration of a device for showing the localization error of each point of a georeferenced image.

The invention also relates to a device 80 for showing the localization error $\epsilon_3$ of a plurality of points $P_3$ of a georeferenced image $A_3$. This device 80 is shown diagrammatically in FIG. 9. It comprises:
- means 82 for providing the georeferenced image $A_3$ to be shown;
- means 84 for providing, for each point of the plurality of points $P_3$ of the georeferenced image $A_3$, an estimated value of the localization error $\epsilon_3$ specific to that point $P_3$, said error not being uniform over the image $A_3$;
- means 86 for showing the georeferenced image $A_3$; and
- means 88 for showing the localization error $\epsilon_3$ for at least one point among the plurality of points $P_3$ of the georeferenced image $A_3$, and advantageously for each point of the plurality of points $P_3$, so as to allow a user to visualize the localization error.

The georeferenced error $A_3$ to be shown is recorded in a database 90. The database 90 is for example stored in a storage means, such as a computer memory. It associates each point $P_3$ of the georeferenced image $A_3$ with coordinates $l_3$, $c_3$ in the georeferenced image $A_3$:
- the announced values $x_T$, $y_T$, $z_T$ of the corresponding geographical coordinates, defining the localization in the terrain T of the object shown by the point $P_3$;
- a value V attributed to said point $P_3$, for example an intensity or radiometry value, said value V being representative of the object represented by point $P_3$; and the localization error $\epsilon_3$ specific to that point $P_3$.

Figure 10:
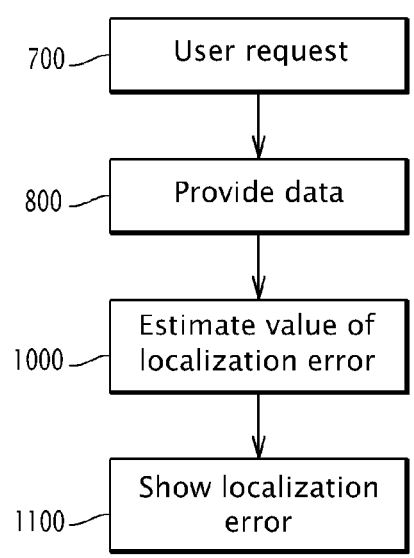
FIG. 10 is a diagrammatic illustration of the method for showing the localization error of each point of a georeferenced image.

FIG. 10 diagrammatically illustrates the method for showing the localization error $\epsilon_3$ in at least one plurality of points $P_3$ of the georeferenced image $A_3$.

In step 700 of that method, the means 82 for providing the georeferenced image $A_3$ provide the georeferenced image $A_3$, for example upon request by a user. To that end, they connect to the database 90 and retrieve data therefrom relative to the georeferenced image $A_3$; in particular, they retrieve, for each point $P_3$ of the georeferenced image $A_3$, the announced values $x_T$, $y_T$, $z_T$ of the corresponding geographical coordinates, as well as the value V attributed to that point $P_3$.

In step 800, they provide the data retrieved from the database 90 to the means 86 for showing the georeferenced image $A_3$. These means 86 then show the georeferenced image $A_3$ so as to allow the user to visualize it. To that end, the means 86 for example display the georeferenced image $A_3$ on a display screen 92 or print the georeferenced image $A_3$.

In step 1000, the means 84 for providing the estimated value of the localization error $\epsilon_3$ connect to the database 90 and retrieve therefrom, for at least one plurality of points $P_3$ of the georeferenced image $A_3$, and advantageously for each point $P_3$ of the georeferenced image $A_3$, the estimated value of the localization error $\epsilon_3$ corresponding to each of said points $P_3$.

In step 1100, the means 88 for showing the localization error show the localization error $\epsilon_3$ corresponding to each point $P_3$ and supplied by the means 84 in step 1000. To that end, they for example produce an error map C showing, for each point $P_3$ of the georeferenced image $A_3$, the estimated value of the localization error $\epsilon_3$. In the error map C, the localization error $\epsilon_3$ is for example coded by the color attributed to the corresponding point $P_3$. Thus, a color level is made to correspond to each value or range of possible values of the localization error $\epsilon_3$. The color coding is for example done using a computer function of the colormap type, this function making a shade of color correspond to each possible value of the localization error $\epsilon_3$. The scale of the colors can for example extend from green to red, green representing the areas of the image $A_3$ in which the localization error $\epsilon_3$ is below a first threshold, for example smaller than the typical distance in the terrain T between two consecutive pixels of the image $A_3$, red representing the areas of the image $A_3$ in which the localization error $\epsilon_3$ is above a second threshold, for example above 10 times the first threshold, and yellow representing the intermediate areas, in which the localization error $\epsilon_3$ is comprised between the first threshold on the second threshold. These threshold values are to be defined according to the needs related to the considered application. It is also possible to translate the histogram of the localization errors $\epsilon_3$ with statistical quantities.

Alternatively, the localization error $\epsilon_3$ is coded using shades of gray, the intensity of a point for example being lower as the localization error $\epsilon_3$ is high.

Figure 11:
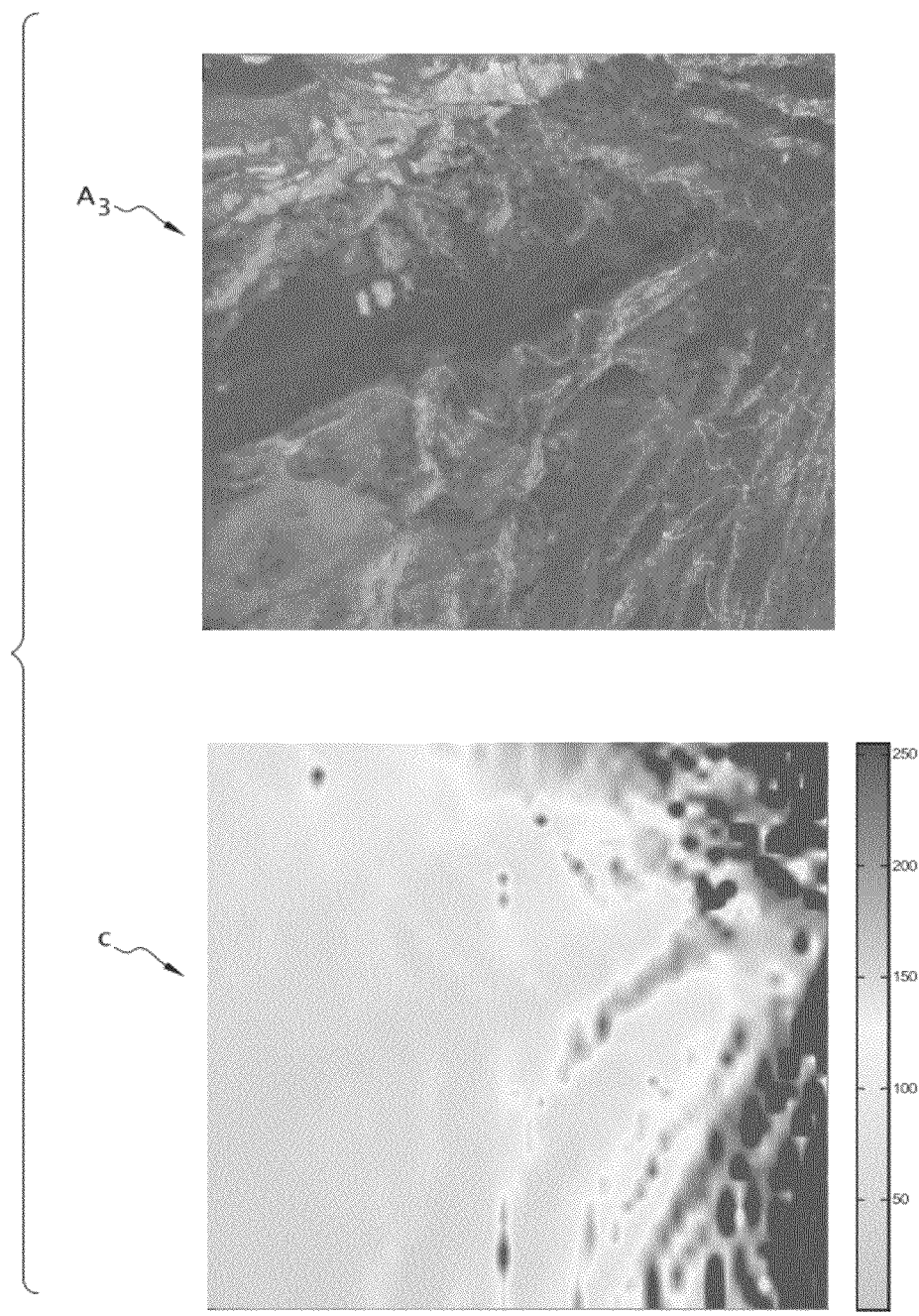
FIG. 11 is an illustration of images shown by the device of FIG. 9 according to one embodiment, the top image being a georeferenced image, and the bottom image being a corresponding error map.

The means 88 for showing the localization error show the error map C, for example by displaying it on the display screen 92, advantageously near the georeferenced image $A_3$, in particular under the georeferenced image $A_3$, as shown in FIG. 11, so as to allow the user to visualize both the georeferenced image $A_3$ and the corresponding error map C at the same time. According to one alternative, the representation means 88 print the error map C.

The color code or gray shading used to code the level of the localization error $\epsilon_3$ at each point of the georeferenced image $A_3$ has the advantage of allowing the user to have a synthesized version of the variability of the localization error $\epsilon_3$ on the georeferenced image $A_3$.

Figure 12:
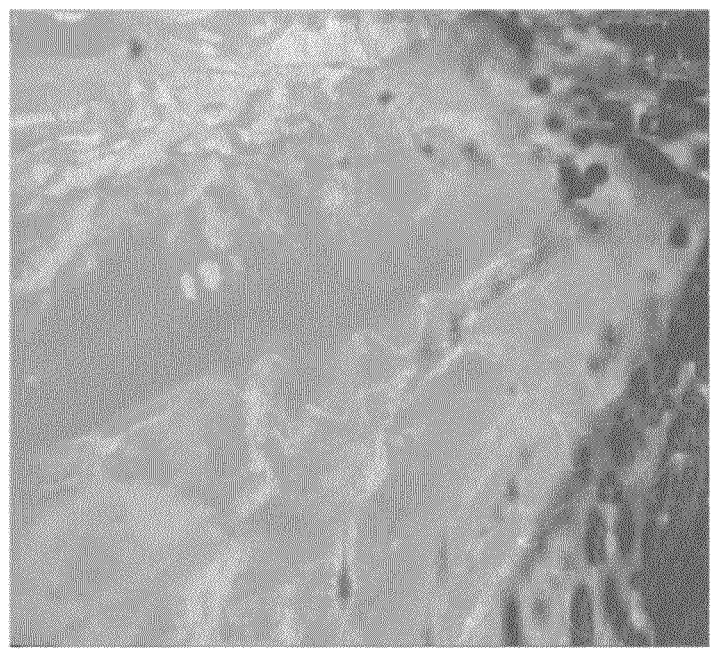
FIG. 12 is an illustration of an image shown by the device of FIG. 9 according to another embodiment, the error map being superimposed on the georeferenced image.

According to the second alternative illustrated in FIG. 12, the means 88 for showing the localization error $\epsilon_3$ show the error map C by superimposing it on the georeferenced image $A_3$ so as to form a combined image $A_4$. In that case, in the combined image $A_4$, the localization error is shown by a first parameter, for example the color shade, while the value V (radiometric value or intensity) of the corresponding point of georeferenced image $A_3$ is shown by a second parameter, for example the level of gray. Furthermore, the device 80 comprises means for adjusting the transparency of the error map C superimposed on the georeferenced image $A_3$. According to this alternative, the error map C is shown superimposed on the georeferenced image $A_3$ permanently. Alternatively, it is shown intermittently on the georeferenced image $A_3$. To that end, it is for example displayed on the georeferenced image $A_3$ blinking, with a blink frequency greater than 0.5 Hz and lower than 20 Hz so as to cause a remanence of the error map C on a user's retina in the blinking interval.

Steps 1000 and 1100 are for example implemented simultaneously with steps 700 and 800.

The method according to the second embodiment only differs from the method according to the first embodiment by the steps described below.

In step 1200, implemented after step 800 for showing the georeferenced image $A_3$, and before step 1000, the user selects a point $P_3$ of the georeferenced image $A_3$, for example using a mouse pointer or through entry using a computer keyboard.

During step 1000, the means 84 for providing the estimated value of the localization error $\epsilon_3$ retrieve, from the database 90, only the estimated value of the localization error $\epsilon_3$ corresponding to said point $P_3$, and not the estimated value of the localization error $\epsilon_3$ of each point $P_3$ or of a plurality of points $P_3$ of the georeferenced image $A_3$.

During step 1100, the means 88 for showing the localization error show the localization error $\epsilon_3$ corresponding to the point $P_3$ and provided by the means 84 in step 1000. To that end, they for example display, near the point $P_3$ or superimposed on the point $P_3$, a label on which information is indicated relative to the localization error $\epsilon_3$, optionally accompanied by the announced coordinates $x_T$, $y_T$, $z_T$ of the geographical localization $P_3$.

Optionally, the label also comprises an indication of the expected value $E(X)$, $E(Y)$, $E(Z)$ of each of the geographical coordinates X, Y, Z.

The information relative to the localization error $\epsilon_3$ is for example a histogram of the probability law $D(X, Y, Z)$ of the geographical coordinates X, Y, Z.

Optionally or alternatively, it involves the standard deviation of each of the geographical coordinates X, Y, Z around its respective announced value $x_T$, $y_T$, $z_T$.

Alternatively, it involves the planimetric standard deviation, representative of the planimetric error, i.e. the localization error relative to the planimetric coordinates X and Y and/or the altimetric standard deviation, corresponding to the standard deviation of the altimetric coordinate Z around its announced value $z_T$.

The representation method according to the second embodiment has the advantage of allowing the user to visualize the localization error $\epsilon_3$ associated with the point $P_3$ of his choice of the georeferenced image $A_3$.

The localization error $\epsilon_3$ shown by the device 80 implementing the representation method as described above is for example a localization error $\epsilon_3$ calculated using the method for determining the localization error described above, and recorded in the database 90.

The georeferenced image $A_3$ is for example a raw georeferenced image, such as the raw georeferenced image $A_0$ or an orthorectified image such as the orthorectified image $A_2$.

The invention claimed is:

1. A method for determining a localization error for a point of a raw image each point of the raw image with image coordinates in the raw image being associated with announced terrain coordinate values defining the geographical localization of the object represented by the point of the raw image; the method comprising the following steps:
providing an exposure function associating each point of the raw image with corresponding terrain coordinates, the exposure function using the magnitudes having a known probability law as parameters of the magnitudes depending on the exposure conditions of the raw image, the magnitudes having a known probability law;
providing a terrain model connecting the terrain coordinates to one another;
deducing, from the exposure function and the terrain model, at least one localization function giving, for a given point of the raw image, at least some of the terrain coordinates for localizing the object shown by the point of the raw image as a function of the magnitudes depending on the exposure conditions of the raw image,
estimating, using the probability law of the magnitudes and at least one localization function applied for the image coordinate point of the raw image, the value of a statistical magnitude characteristic of a probability law of at least one of the terrain coordinates associated with the point of the raw image; and
deducing the localization error of the point of the raw image from the value of the statistical magnitude.

2. The method according to claim 1, wherein the statistical magnitude is representative of the dispersion of at least one terrain coordinate around its announced value.

3. The method according to claim 1, wherein the statistical magnitude is a magnitude chosen in the group consisting of the standard deviation and the quantile values of the distribution of the localization error, in particular a value at n %, such as the median or the value at 90%.

4. The method according to claim 1, wherein the terrain model is provided with an error model whereof the probability law is known, the Monte Carlo method is used, with the help of the probability law of the error model of the terrain model, to generate a set of observations of the terrain model so that that set obeys the probability law of the error model, and wherein each localization function corresponds to a Monte Carlo draw of the terrain model.

5. The method according to claim 1, wherein the terrain model does not have an error model, and wherein a localization function is accurately deduced from the exposure function and the terrain model.

6. The method according to claim 1, wherein to estimate the statistical magnitude:
a set of observations is generated for each of the magnitudes so that at least the average and the covariance matrix of that set are equal to the expected value and the covariance matrix grandeurs of the magnitudes, respectively;
that set of observations is propagated through at least one localization function to obtain at least one set of observations of at least one terrain coordinate;
an estimate of the statistical magnitude representative of the probability law of the at least one terrain coordinate is deduced therefrom.

7. The method according to claim 1, wherein the statistical magnitude is estimated using the Monte Carlo method, by:
generating, using the probability laws of the magnitudes, a set of observations of each of the magnitudes, so that that set obeys the probability law of the magnitudes;
propagating that set of observations through at least one localization function to obtain at least one set of observations for the at least one terrain coordinate;
estimating the probability law of the at least one terrain coordinate from said at least one set of observations of the at least one terrain coordinate;
deducing the statistical magnitude from the estimated probability law of the at least one terrain coordinate.

8. The method according to claim 1, wherein the expected value of each of the magnitudes and a covariance matrix of the magnitudes being known, the statistical magnitude is estimated using the sigma points method, by:
choosing a set of sigma points, each given a weight, each sigma point constituting an observation of each of the magnitudes, the set of sigma points being chosen so that the expected value and the covariance calculated by weighted average from that set of sigma points respectively correspond to the expected value and the covariance matrix of the magnitudes;
propagating that set of observations through the at least one localization function to obtain at least one set of observations of the at least one terrain coordinate; and
estimating the statistical magnitude from the at least one set of observations of the at least one field coordinate.

9. A method for determining a localization error of a point of a georeferenced image, built from at least one raw image, the method comprising the following steps:
determining an image coordinate point of one of the raw images from which the point of the georeferenced image was built;
implementing the method for determining a localization error according to claim 1, applied to the point of the raw image determined in the previous step, the considered raw image being the raw image to which said determined point of the raw image belongs, so as to determine the localization error of the point of the raw image;
deducing, from the localization error of the point of the raw image, the localization error of the point of the georeferenced image built from the raw image.

10. A device for determining a localization error of a point of a raw image, the raw image being georeferenced, each point of the raw image with image coordinates in the raw image being associated with announced terrain coordinate values defining the geographical localization of the object represented by the point of the raw image;
the device comprising:
means for supplying an exposure function associating each point of the raw image with corresponding terrain coordinates, the exposure function using the magnitudes depending on the exposure conditions of the raw image as parameters, the magnitudes having a known probability law;
means for supplying a terrain model connecting the terrain coordinates to one another;
means for deducing, from the exposure function and the terrain model, at least one localization function yielding, for a given point of the raw image, at least some of the terrain coordinates for localizing the object represented by the point of the raw image as a function of magnitudes depending on the exposure conditions of the raw image, the magnitudes having a known probability law,
means for estimating, using at least one localization function applied for the image coordinate point of the raw image and the probability law of the magnitudes, the value of a statistical magnitude characteristic of a probability law of at least one of the terrain coordinates associated with the point of the raw image; and means for deducing the localization error of the point of the raw image from the value of the statistical magnitude.

11. A device for determining a localization error of a point of a georeferenced image, built from at least one raw image, the device comprising:

means for determining an image coordinate point of one of the raw images from which the point of the georeferenced image was built;

a determination device according to claim 10, which is able to determine a localization error of the point of the raw image determined by the means to determine an image coordinate point of one of the raw images from which the point of the georeferenced image was built, the considered raw image being the raw image to which said point belongs;

means for deducing, from the localization error of the point of the raw image, the localization error of the point of the georeferenced image built from the raw image.

* * * * *